United States Patent
Tooley et al.

(10) Patent No.: US 12,326,103 B2
(45) Date of Patent: Jun. 10, 2025

(54) PRESSURE REGULATOR FOR ENGINE LUBRICATION SYSTEM

(71) Applicant: Cummins Inc., Columbus, IN (US)

(72) Inventors: Simon Tooley, Stockton-on-Tees (GB); Daniel McNish, Tyne & Wear (GB); Jason Kenneth Rigg, Hartlepool (GB)

(73) Assignee: Cummins Inc., Columbus, IN (US)

( * ) Notice: Subject to any disclaimer, the term of this patent is extended or adjusted under 35 U.S.C. 154(b) by 105 days.

(21) Appl. No.: 18/172,652

(22) Filed: Feb. 22, 2023

(65) Prior Publication Data

US 2023/0193793 A1    Jun. 22, 2023

Related U.S. Application Data

(63) Continuation of application No. PCT/US2021/070974, filed on Jul. 27, 2021.

(Continued)

(51) Int. Cl.
*F01M 1/16* (2006.01)
*F01M 1/02* (2006.01)
(Continued)

(52) U.S. Cl.
CPC ............... *F01M 1/16* (2013.01); *F01M 1/02* (2013.01); *F01M 11/02* (2013.01); *F04B 53/129* (2013.01);
(Continued)

(58) Field of Classification Search
CPC . F01M 1/16; F01M 1/02; F01M 11/02; F04B 53/129; F04B 23/025; F04B 49/022;
(Continued)

(56) References Cited

U.S. PATENT DOCUMENTS

| 3,801,228 A | 4/1974 | Mueller |
| 4,471,802 A | 9/1984 | Pryor |

(Continued)

FOREIGN PATENT DOCUMENTS

CN    106463860 A    8/2019

OTHER PUBLICATIONS

International Search Report and Written Opinion, PCT Appln. No. PCT/US21/70974, Nov. 15, 2021, 11 pgs.
(Continued)

*Primary Examiner* — Grant Moubry
*Assistant Examiner* — Ruben Picon-Feliciano
(74) *Attorney, Agent, or Firm* — Taft Stettinius & Hollister LLP

(57) ABSTRACT

A lubrication system for an internal combustion engine includes a fluid flow control device at the outlet side of the pump that regulates pressure conditions at the outlet side of the pump upstream of the lubrication circuit in the engine. The fluid flow control device includes a chamber that is opened in response a fluid pressure exceeding a threshold to allow the fluid to pass from the outlet side of the pump back to the inlet side of the pump. The fluid flow control device also includes at least one elongated aperture in communication with the chamber for receiving fluid fed from the chamber and allowing the fluid in the chamber to flow to the inlet side of the pump.

17 Claims, 4 Drawing Sheets

Related U.S. Application Data

(60) Provisional application No. 63/073,558, filed on Sep. 2, 2020.

(51) Int. Cl.
  *F01M 11/02* (2006.01)
  *F04B 53/12* (2006.01)
  *F04D 15/00* (2006.01)
  *F16K 31/122* (2006.01)

(52) U.S. Cl.
  CPC ...... *F04D 15/0011* (2013.01); *F16K 31/1221* (2013.01); *F05D 2260/96* (2013.01); *F05D 2260/98* (2013.01)

(58) Field of Classification Search
  CPC .. F04B 49/08; F04D 15/0011; F16K 31/1221; F05D 2260/96; F05D 2260/98
  See application file for complete search history.

(56) References Cited

U.S. PATENT DOCUMENTS

| | | |
|---|---|---|
| 6,082,321 A | 7/2000 | Kopec |
| 6,095,177 A | 8/2000 | Machat et al. |
| 6,810,664 B1 | 11/2004 | Lorenc |
| 7,331,323 B2 | 2/2008 | Hara |
| 7,766,041 B2 | 8/2010 | Tackes et al. |
| 8,322,372 B2 | 12/2012 | Tackes et al. |
| 9,068,511 B2 | 6/2015 | Podgorski et al. |
| 9,212,608 B2 | 12/2015 | Ballard et al. |
| 9,930,796 B2 | 3/2018 | Fantin et al. |
| 2001/0022195 A1 | 9/2001 | Kazaoka |
| 2010/0243940 A1 | 9/2010 | Terada et al. |
| 2014/0311585 A1 | 10/2014 | Rickis |
| 2015/0107686 A1 | 4/2015 | Watanabe et al. |
| 2016/0265679 A1* | 9/2016 | Shepherd .................. F01M 1/16 |

OTHER PUBLICATIONS

Chinese Office Action, Chinese Appln. No. 201880070864.7, 11 pgs., dated Feb. 11, 2023.
Extended European Search Report, EP Application No. 21865287.3, Dated Sep. 4, 2024, 7 pgs.

* cited by examiner

PRESSURE REGULATOR FOR ENGINE LUBRICATION SYSTEM

CROSS-REFERENCE TO RELATED APPLICATION

This application is a continuation of International PCT Application No. PCT/US21/70974 filed on Jul. 27, 2021, which claims priority to U.S. Provisional Application No. 63/073,558 filed on Sep. 2, 2020, which are incorporated herein by reference in their entirety for all purposes.

FIELD OF THE DISCLOSURE

The present disclosure relates generally to internal combustion engines, and more particularly, but not exclusively, to a pressure regulator for a lubrication system of the engine.

BACKGROUND

Generally, fluid flow control devices have been used in internal combustion engines to control the flow of oil and other fluids to provide lubrication and cooling of one or more components of the engine. For example, pressure regulators can be used to limit or prevent excessive pressure conditions in the lubrication circuit due to operation of the oil pump. However, current pressure regulators may perform in an unsatisfactory manner as a result of pulsed outlet flow from the pump. The pulsed outlet flow may cause uncontrolled cycling of the pressure regulator due to large changes in the oil pressure when the pressure regulator opens and discharges oil into the suction side of the pump. This may cause excessive noise, premature wear of the regulator spring, and rapid oscillations in the oil flow which may lead to oil pressure instability. As such, there exists a need for improvement in fluid flow control devices for lubrication and cooling of components in an internal combustion engine.

SUMMARY

The present disclosure includes a unique system and/or apparatus for regulating fluid flow in a lubrication circuit of an internal combustion engine. The lubrication system includes a reservoir from which fluid is fed and a pump for circulating fluid through the lubrication circuit of the engine. The lubrication system includes a fluid flow control device at the outlet side of the pump that regulates pressure conditions output from the pump upstream of the lubrication circuit in the engine. In one embodiment, the fluid flow control device includes a first chamber that opens in response a fluid pressure exceeding a threshold to allow the fluid to pass from the outlet side of the pump back to the suction or inlet side of the pump. The fluid flow control device also includes at least one elongated aperture in communication with the chamber for receiving fluid fed from the chamber and allowing the fluid in the chamber to flow to the inlet side of the pump.

Another embodiment includes a fluid flow control device for regulating a pressure in a lubrication circuit in an internal combustion engine. The fluid flow control device includes an elongated body having an opening at a first end of the body, and a chamber extending from the first end of the body to a second end of the body. The elongated body includes a number of axially elongate apertures (one or more) along its perimeter that open into the chamber and at an exterior of the elongated body. The aperture(s) allow fluid in the chamber to flow to an inlet side of the pump. The fluid is admitted into the chamber by a spring loaded valve member in the first end opening that is configured to crack open in response to the outlet pressure of the fluid from pump exceeding a predetermined threshold.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
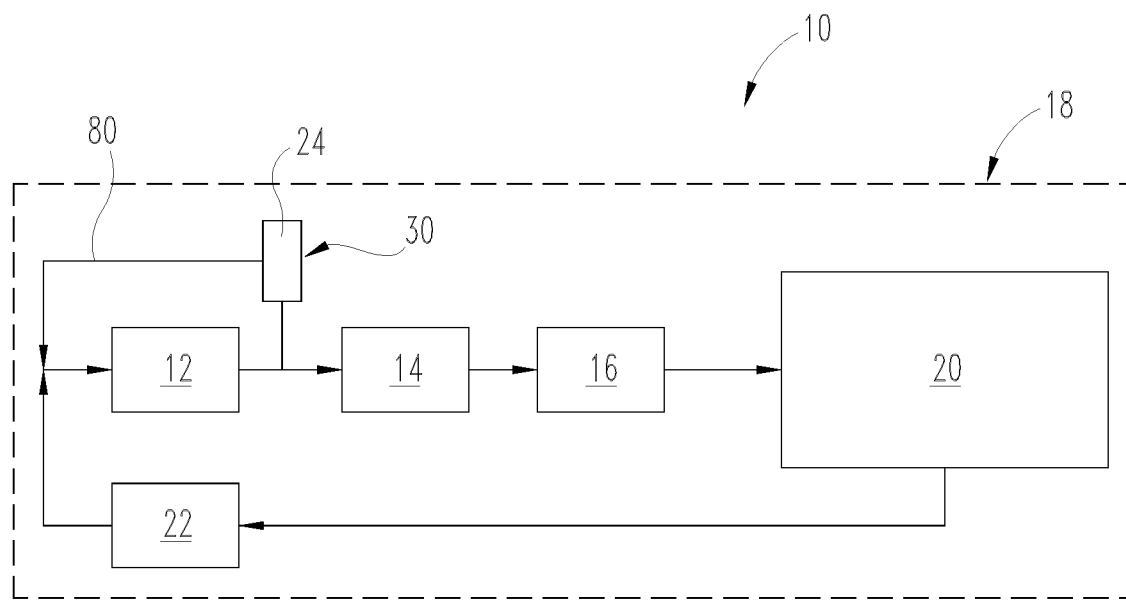
FIG. 1 is a schematic block diagram of an example engine fluid lubrication system having a fluid flow control device, according to an embodiment of the present disclosure.

The present disclosure relates to a lubrication system for an internal combustion engine having a mechanically controlled fluid flow control device configured to open when a fluid pressure in a lubrication circuit exceeds a threshold pressure. In an embodiment, referring to FIG. 1, the lubrication system 10 includes a fluid flow control device 30 that is, for example, a pressure regulator valve 24, positioned downstream of the lubrication fluid pump 12 and upstream of the lubrication fluid filter 14 of the engine 18. Lubrication system 10 further includes a rifle 16 that provides lubrication fluid flow path to a plurality of engine components 20 and/or other rifles (not shown) for distribution about various components and locations relative to the engine 18. The lubrication fluid returns to a reservoir such as a sump 22 at or near the inlet or suction side of pump 12. It should be understood that not all components or aspects of a lubrication system are illustrated, and system 10 may be configured according to any known engine fluid lubrication system that incorporates the inventive fluid flow control device 30 of the present disclosure. Furthermore, while the lubrication fluid may be engine oil according to one embodiment, other types of fluids and fluid circuits are also contemplated in which the fluid flow control device 30 may be employed.

The pressure regulator valve 24 is located at the outlet side of lubrication fluid pump 12 and controls a pulsed output flow from the pump 12 by opening when the lubrication fluid pressure exceeds a threshold pressure. Opening of pressure regulator valve 24 recirculates lubrication fluid back to the inlet side of pump 12. As discussed further below, the pressure regulator valve 24 includes at least one elongated aperture for recirculation of the lubrication fluid that slows the displacement of the plunger of the pressure regulator valve 24 as the plunger progressively opens the elongated aperture for lubrication fluid recirculation. As a result, pulsed output flow of lubrication fluid from the pump 12 is smoothed and oscillations in the lubrication fluid are reduced. The fluid flow control device 30 disclosed herein provides progressive opening and closing of the recirculation path, which allows placement of the pressure regulator device close to the outlet of pump 12, such as within about 50 millimeters of the pump outlet. Other embodiments contemplate other distances depending on the parameters and requirements for the lubrication system. Furthermore, the system 10 does not require a separate bypass valve for the lubrication fluid during cold start conditions, and does not require the use of a pressure relief valve in the system 10.

Figure 2A:
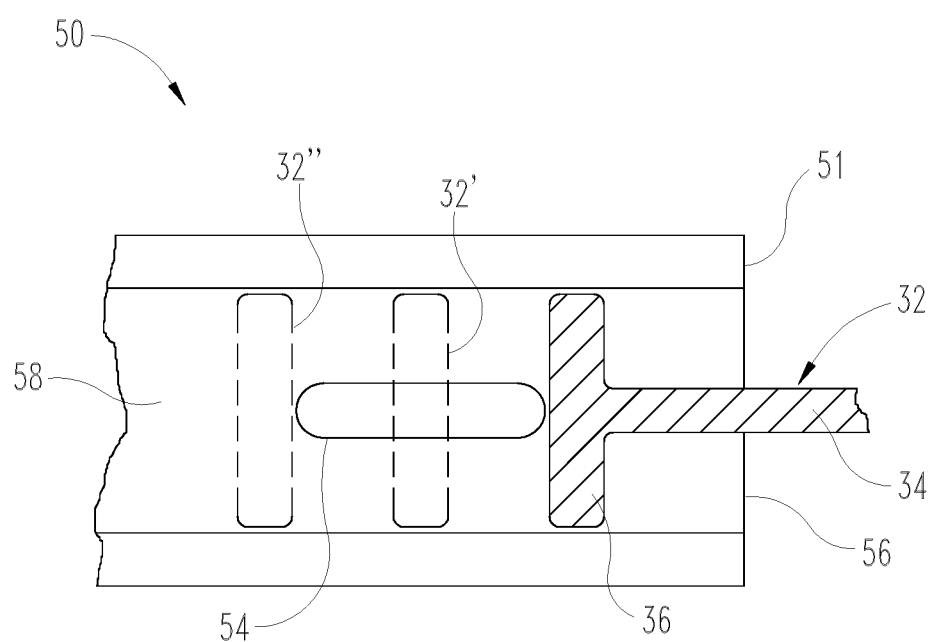
FIG. 2A is a schematic section view showing progressive opening of the fluid flow control device.
Figure 2:
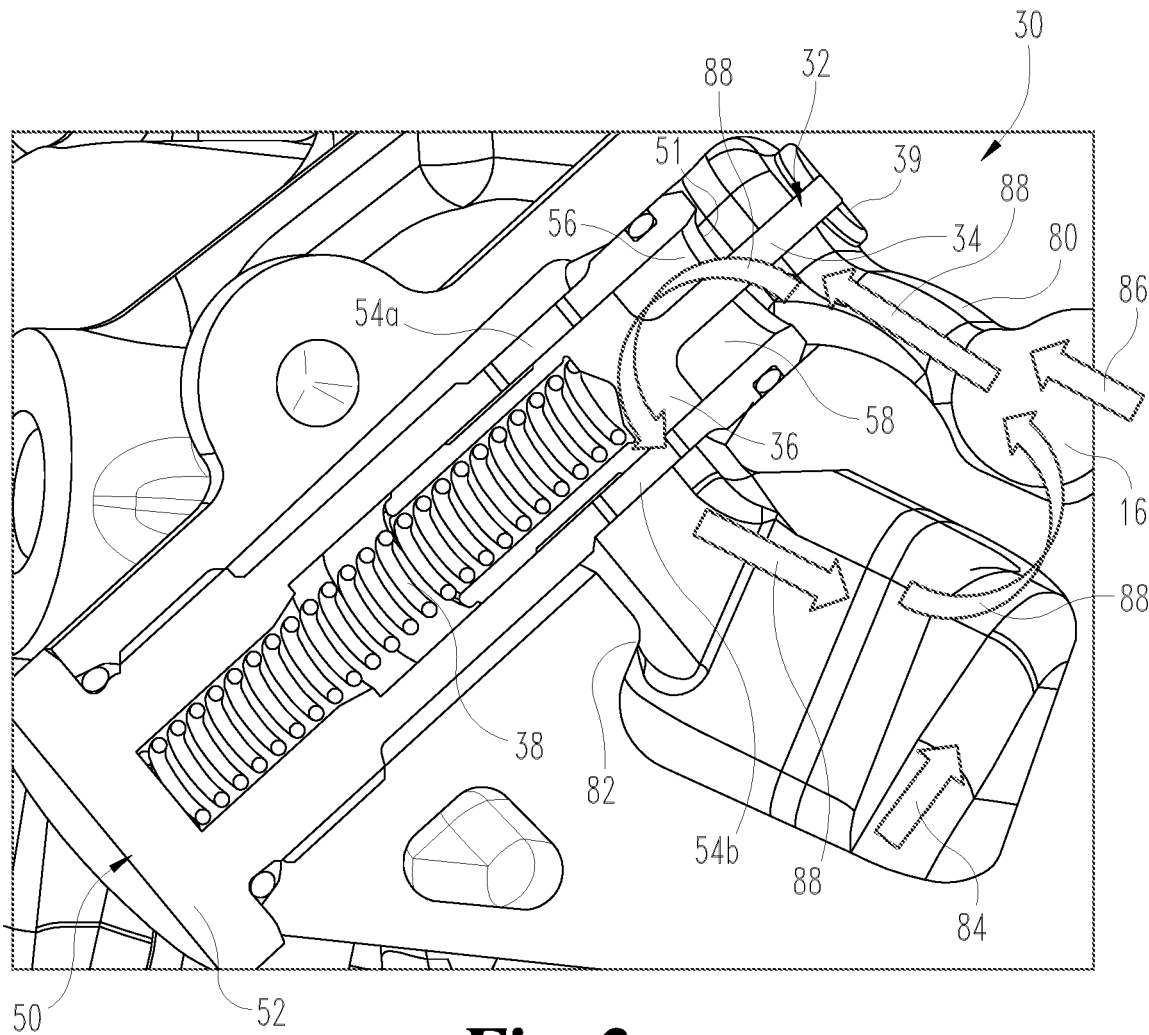
FIG. 2 is a section view into the rifle housing the fluid flow control device in a closed position, and showing the recirculation path from the outlet side to the inlet side of the pump of the lubrication system of FIG. 1 when the fluid flow control device is in an open position.
Figure 3:
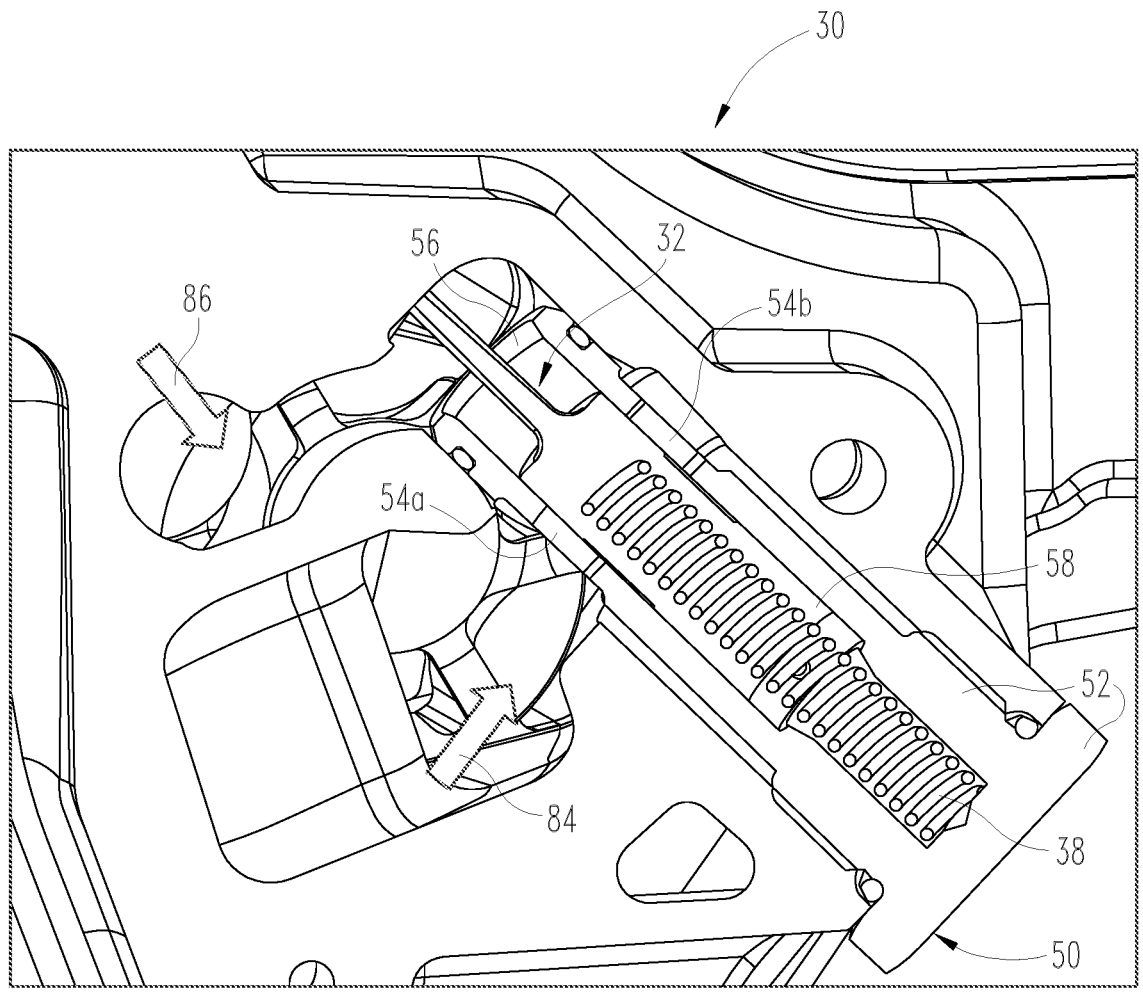
FIG. 3 is another section view of the rifle of FIG. 2 with the closed fluid flow control device in a direction facing the pump.

Referring to FIGS. 2-3, an embodiment of the fluid flow control device 30 is shown in a recirculation flow path 80 in fluid communication with the rifle 16 at the outlet side of pump 12 and upstream of filter 14. Flow path 80 includes a flow of fluid from the sump 22 that is drawn by the pump 12 as indicated by arrow 84, a flow to the engine 20 from the pump outlet as indicated by arrow 86, and a regulated flow through the fluid flow control device 30 when the fluid flow control device 30 is open as indicated by arrows 88.

Fluid flow control device 30 includes an elongated body 50 defining a chamber 58 that has an opening 56 at a first end 51 of body 50. Chamber 58 is closed at an opposite second end 52 of body 50. Body 50 includes at least one elongated aperture, such as opposite elongated apertures 54a, 54b, in fluid communication with chamber 58 and exterior side of body 50. Other embodiments contemplate a single elongated aperture 54, or more than two elongated apertures, or one or more elongated apertures in combination with one or more apertures having a different shape. If multiple elongated apertures are provided, they need not be directly opposite one another. In the illustrated embodiment, aperture(s) 54 include a racetrack shape extending along the longitudinal axis of body 50. Other shapes are also contemplated, such as oval shapes, that provide a controlled opening to relieve pressure in response to an oscillating pressure input.

Apertures 54a, 54b allow lubrication fluid entering opening 56 to flow from chamber 58 to an exterior of body 50. In one embodiment, the opening 56 is located at the first end 51 of body 50 and is in fluid communication with recirculation flow path 80 and chamber 58 when fluid flow control device 30 is opened in response to pressure conditions at the outlet side of pump 12 exceeding a threshold. Other embodiments contemplate opening 56 may be located in a side wall of body 50 adjacent to first end 51. Apertures 54a, 54b are in fluid communication with chamber 58 and inlet side 82 of pump 12 to allow recirculation of the lubrication fluid when the fluid flow control device is opened in response to pressure conditions exceeding a threshold pressure.

In the example embodiment, the fluid flow control device 30 may include a plunger 32 housed in chamber 58 adjacent opening 56. As shown in FIG. 2A, the plunger 32 is passively controlled to move into chamber 58 to open and close recirculation flow path 80 between the outlet side of pump 12 and the inlet side of pump 12 in response to a pressure condition exceeding a pressure threshold, such as a cracking pressure, sufficient to overcome the biasing closing force of spring 38 and displace plunger into chamber 58 along the apertures 54a, 54b, as shown by plunger 32'. As the pressure increases, the more plunger 32 is displaced progressively along apertures 54a, 54b, providing additional open area for fluid flow via apertures 54a, 54b as shown by plunger 32". As the pressure decreases, the spring 38 returns the plunger 32 toward its normally closed position and closes the fluid flow path when the pressure drops below the pressure threshold, as shown by plunder 32. In the closed position, lubrication fluid cannot flow through fluid flow control device 30 to the inlet side of pump 12.

The plunger 32 may include a base 36 at one end thereof with base 36 located in chamber 58. Plunger 32 may also include a stem 34 extending outwardly from base 36 through end opening 56 at the first end 51 of body 50. Stem 34 can extend into a passage 39 in the engine block or other structure for guiding movement of plunger 32. Spring 38 can be received in and contact base 36. Spring 38 extends from the based 36 and contacts the second end 52 of body 50 in chamber 58.

Figure 4:
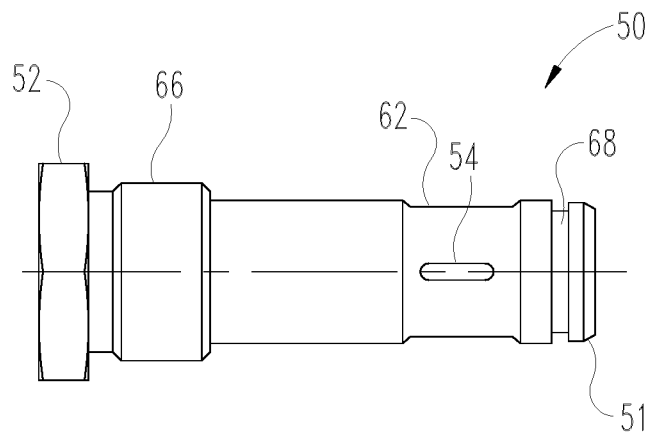
FIG. 4 is an elevation view of a body of the fluid flow control device.
Figure 5:
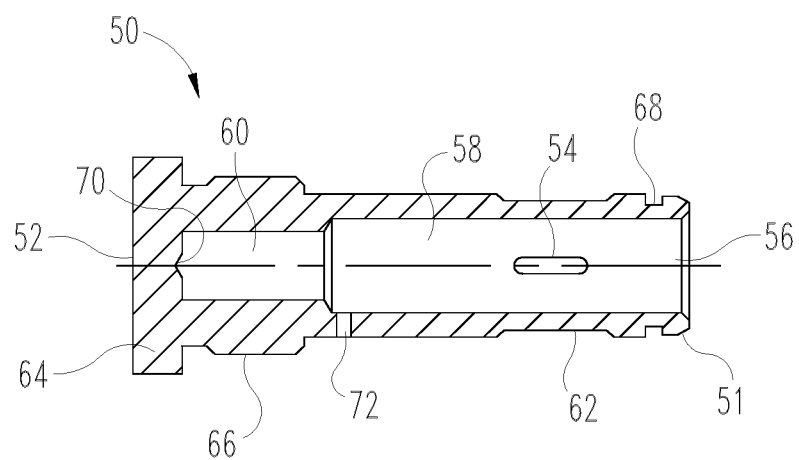
FIG. 5 is a section view of the body of the fluid flow control device of FIG. 4.

Referring to FIGS. 4-5, the body 50 is elongated and cylindrical from the opening 56 at its first end 51 to second end 52. Second end 52 can include a flange 64 for engagement with a tool for the insertion and removal of body 50 from the engine block. Body 50 may also define threads 66 adjacent second end 52 for threaded engagement with the engine block.

Body 50 may also include a circumferential groove 68 adjacent first end 51 for receipt of an O-ring seal to seal the exterior of body 50 around first end 51 from the recirculation fluid flow 80. Body 50 also includes an elongated grooved portion 62 around apertures 54a, 54b that form a recess in body 50 around apertures 54a, 54b, allowing lubrication fluid to exit chamber 58 for recirculation.

Chamber 58 includes a reduced diameter portion 60 adjacent second end 52 that extends to a blind end 70 of chamber 58. The spring 38 abuts second end 52 at blind end 70. A hole 72 is provided in body 50 in communication with chamber 58 to assist in maintaining pressure balance in chamber 58 as plunger 32 moves back and forth in chamber 58. Hole 72 allows fluid to move in and out of the rear part of chamber 58 (behind plunger 32) to prevent hydraulic lock.

Further written description of a number of example aspects of the present disclosure and embodiments thereof shall now be provided. It should be appreciated that any combination of one or more of the embodiments is contemplated.

According to one aspect of the present disclosure, a lubrication system for an internal combustion engine includes a reservoir from which fluid is fed by a pump for circulation through the lubrication system via a fluid flow path. A flow control device is coupled to the fluid flow path downstream of an outlet side of the pump. The flow control device includes an elongated body defining a chamber extending from a first end of the body toward a second end of the body, a plunger at the first end of the body configured to normally close the chamber at the first end of the body and to displace into the body to admit fluid into the chamber in response to a fluid pressure in the fluid flow path exceeding a threshold. At least one elongated aperture along the body allows fluid to flow from the chamber to an inlet side of the pump as the plunger is displaced into the body.

In an embodiment, the plunger is spring-loaded and is movable to selectively open and close the chamber from the fluid flow path. In an embodiment, the plunger includes a base oriented toward the first end and a stem extending from the base toward the second end of the body.

In an embodiment, the at least one elongated aperture is two elongated apertures. In an embodiment, the two elongated apertures are located on opposite sides of the body.

In an embodiment, the at least one elongated aperture is racetrack-shaped in that it is rectangular along opposite sides and has circular ends, with the elongated sides extending along a longitudinal axis of the body. In an embodiment, the at least one elongated aperture is located closer to the first end of the body than the second end of the body.

In an embodiment, the at least one elongated aperture extends from a first end of the at least one elongated aperture oriented toward the first end of the body to an opposite second end of the at least one elongated aperture and, as the plunger is moved into the body to admit fluid into the chamber, the plunger moves along the at least one elongated aperture from the first end toward the second end to progressively expose the at least one elongated aperture to the fluid admitted into the chamber for circulation to the inlet side of the pump through an exposed part of the at least one elongated aperture.

In an embodiment, the body defines a grooved portion that forms a recess in an exterior of the body around the at least one elongated aperture. In an embodiment, the body includes a flange at the second end of the body and an exterior threaded portion that is located adjacent the flange. In an embodiment, the chamber extends to a blind end adjacent the second end of the body.

In an embodiment, the body includes a hole extending therethrough adjacent the second of the body. In an embodiment, the fluid flow control device is located with on the outlet side of the pump.

According to another aspect of the present disclosure, a flow control device for controlling a pressure in a fluid flow path of an internal combustion engine is provided. The flow control device includes an elongated cylindrical body defining a chamber extending from a first end of the body toward a second end of the body. A plunger at the first end of the body is configured to normally close the chamber at the first end of the body and to displace into the body to admit fluid into the chamber in response to the pressure in the fluid flow path exceeding a threshold. At least one elongated aperture along the body opens into the chamber and at an exterior side of the body to allow fluid flow therethrough in response to the plunger being displaced into the body.

In one embodiment, the plunger is spring-loaded and is movable to selectively open and close the chamber from the fluid flow path. In one embodiment, the at least one elongated aperture is two elongated apertures located on opposite sides of the body.

In one embodiment, the at least one elongated aperture extends from a first end of the at least one elongated aperture oriented toward the first end of the body to an opposite second end of the at least one elongated aperture. As the plunger is moved into the body to admit fluid into the chamber, the plunger moves along the at least one elongated aperture from the first end toward the second end to progressively expose the at least one elongated aperture to the fluid admitted into the chamber for circulation through an exposed part of the at least one elongated aperture.

In one embodiment, the body defines a grooved portion that forms a recess in an exterior of the body around the at least one elongated aperture. In an embodiment, the body includes a flange at the second end of the body and an exterior threaded portion that is located adjacent the flange, and the chamber extends to a blind end adjacent the second end of the body. In an embodiment, the body includes a hole extending therethrough adjacent the second of the body.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lubrication system for an internal combustion engine, comprising:
   a reservoir from which fluid is fed by a pump for circulation through the lubrication system via a fluid flow path; and
   a flow control device coupled to the fluid flow path downstream of an outlet side of the pump, the flow control device including an elongated body defining a chamber extending from a first end of the body toward a second end of the body, a plunger at the first end of the body configured to normally close the chamber at the first end of the body and to displace into the body to admit fluid through an opening at or adjacent the first end into the chamber in response to a fluid pressure in the fluid flow path exceeding a threshold, and at least one elongated aperture extending along a longitudinal axis of the body, the elongated aperture being configured to slow displacement of the plunger as the plunger progressively opens the at least one elongated aperture to allow fluid to flow from the chamber through the elongated aperture to an inlet side of the pump as the plunger is displaced into the body, wherein the at least one elongated aperture is two elongated apertures located on opposite sides of the body.

2. The system of claim 1, wherein the plunger is spring-loaded and is movable to selectively open and close the chamber from the fluid flow path.

3. The system of claim 2, wherein the plunger includes a base oriented toward the first end and a stem extending from the base toward the second end of the body.

4. The system of claim 1, wherein the at least one elongated aperture is racetrack-shaped.

5. The system of claim 1, wherein the at least one elongated aperture is located closer to the first end of the body than the second end of the body.

6. The system of claim 1, wherein the at least one elongated aperture extends from a first end of the at least one elongated aperture oriented toward the first end of the body to an opposite second end of the at least one elongated aperture and, as the plunger is moved into the body to admit fluid into the chamber, the plunger moves along the at least one elongated aperture from the first end toward the second end as the fluid pressure in the fluid flow path increases to progressively expose the at least one elongated aperture to the fluid admitted into the chamber for circulation to the inlet side of the pump through an exposed part of the at least one elongated aperture.

7. The system of claim 1, wherein the body defines a grooved portion that forms a recess in an exterior of the body around the at least one elongated aperture.

8. The system of claim 7, wherein the body includes a flange at the second end of the body and an exterior threaded portion that is located adjacent the flange.

9. The system of claim 8, wherein the chamber extends to a blind end adjacent the second end of the body.

10. The system of claim 1, wherein the body includes a hole extending therethrough adjacent the second end of the body.

11. The system of claim 1, wherein the flow control device is located on an outlet side of the pump.

12. A flow control device for controlling a pressure in a fluid flow path of an internal combustion engine, comprising:
an elongated cylindrical body defining a chamber extending from a first end of the body toward a second end of the body, a plunger at the first end of the body configured to normally close the chamber at the first end of the body and to displace into the body to admit fluid through an opening at or adjacent the first end into the chamber in response to the pressure in the fluid flow path exceeding a threshold, and at least one elongated aperture extending along a longitudinal axis of the body that opens into the chamber and at an exterior side of the body, the elongated aperture being configured to slow displacement of the plunger as the plunger progressively opens the at least one elongated aperture to allow fluid flow from the chamber therethrough in response to the plunger being displaced into the body, wherein the at least one elongated aperture is two elongated apertures located on opposite sides of the body.

13. The flow control device of claim 12, wherein the plunger is spring-loaded and is movable to selectively open and close the chamber from the fluid flow path.

14. The flow control device of claim 12, wherein the at least one elongated aperture extends from a first end of the at least one elongated aperture oriented toward the first end of the body to an opposite second end of the at least one elongated aperture and, as the plunger is moved into the body to admit fluid into the chamber, the plunger moves along the at least one elongated aperture from the first end toward the second end as the fluid pressure in the fluid flow path increases to progressively expose the at least one elongated aperture to the fluid admitted into the chamber for circulation through an exposed part of the at least one elongated aperture.

15. The flow control device of claim 12, wherein the body defines a grooved portion that forms a recess in an exterior of the body around the at least one elongated aperture.

16. The flow control device of claim 15, wherein:
the body includes a flange at the second end of the body and an exterior threaded portion that is located adjacent the flange; and
the chamber extends to a blind end adjacent the second end of the body.

17. The flow control device of claim 16, wherein the body includes a hole extending therethrough adjacent the second end of the body.

* * * * *